United States Patent [19]
Li

[11] Patent Number: 6,089,587
[45] Date of Patent: Jul. 18, 2000

[54] DUAL-PURPOSE STEP OF TRICYCLE FOR CHILDREN

[76] Inventor: Hsing Li, 17 Yong Hsing Street, North District, Taichung, Taiwan

[21] Appl. No.: 09/253,759

[22] Filed: Feb. 22, 1999

[51] Int. Cl.[7] .................................................. B62H 1/00
[52] U.S. Cl. ........................................... 280/291; 280/282
[58] Field of Search .................................... 280/291, 282, 280/7.17; 74/564

[56] References Cited

U.S. PATENT DOCUMENTS

| | | | |
|---|---|---|---|
| 4,325,565 | 4/1982 | Winchell | 280/282 |
| 4,546,991 | 10/1985 | Alen et al. | 280/282 |
| 4,909,538 | 3/1990 | Langton | 280/772 |
| 5,028,066 | 7/1991 | Garth | 280/282 |
| 5,169,165 | 12/1992 | Oates | 280/87.03 |
| 5,176,393 | 1/1993 | Robertson et al. | 280/250.1 |
| 5,383,676 | 1/1995 | Valentino | 280/271 |

*Primary Examiner*—Paul N. Dickson
*Assistant Examiner*—Daniel Yeagley
*Attorney, Agent, or Firm*—Bacon & Thomas, PLLC

[57] ABSTRACT

A tricycle for children is provided with a step which is mounted under the saddle of the tricycle and is provided with a front peripheral wall and a rear peripheral wall having two hooks to catch the rear wheel frame of the tricycle. The step is provided at the center of the upper side thereof with a hollow cylinder in which two fasteners are received such that one end of each of the two fasteners is fastened with the middle frame of the tricycle, and that other end of each of the two fasteners is fastened with the underside of the step. The step is intended to accommodate one or both feet of a child seated on the saddle of the tricycle so as to prevent the foot or feet of the child from being hurt by the tricycle front wheel in motion or the pedals in operation.

1 Claim, 3 Drawing Sheets

DUAL-PURPOSE STEP OF TRICYCLE FOR CHILDREN

FIELD OF THE INVENTION

The present invention relates generally to a tricycle for children, and more particularly to a dual-purpose step of the tricycle for children. The dual-purpose step may be used as a rack or means for protecting the foot of a child riding the tricycle.

BACKGROUND OF THE INVENTION

The conventional tricycles for children are generally devoid of a protective means which is located between the front wheel and the rear wheels for protecting the foot of a child riding the tricycle. The feet of a child learning to ride a tricycle are vulnerable to injury by the pedals or wheels in motion.

SUMMARY OF THE INVENTION

The primary objective of the present invention is therefore to provide a tricycle with a dual-purpose step for protecting the foot or feet of a child learning to ride the tricycle.

The dual-purpose step of the present invention is fastened under the saddle of the tricycle and is provided with a front peripheral wall and a rear peripheral wall smaller in height than the front peripheral wall. The rear peripheral wall is provided with two hooks which are used to catch the rear wheel frame of the tricycle. The step is provided at the center of the upper side thereof with a hollow cylinder which is provided with two L-shaped fasteners for fastening with the middle frame of the tricycle. The step is intended to accommodate both feet of a child who is learning to ride a tricycle which is pushed by an adult. When the tricycle is in motion, both feet of the child riding the tricycle are kept in the step so as to prevent both feet of the child from being hit or injured by the front wheel or pedals in motion.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
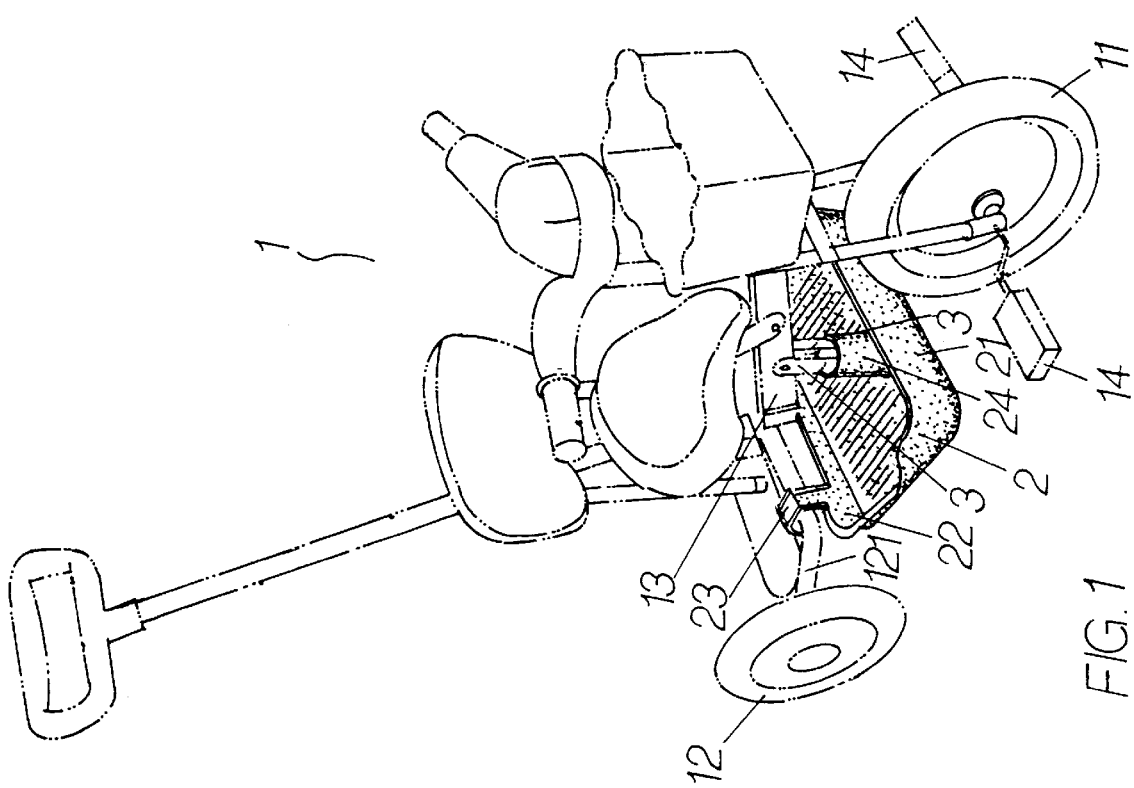
FIG. 1 shows a perspective view of a tricycle which is provided with a step of the preferred embodiment of the present invention.
Figure 2:
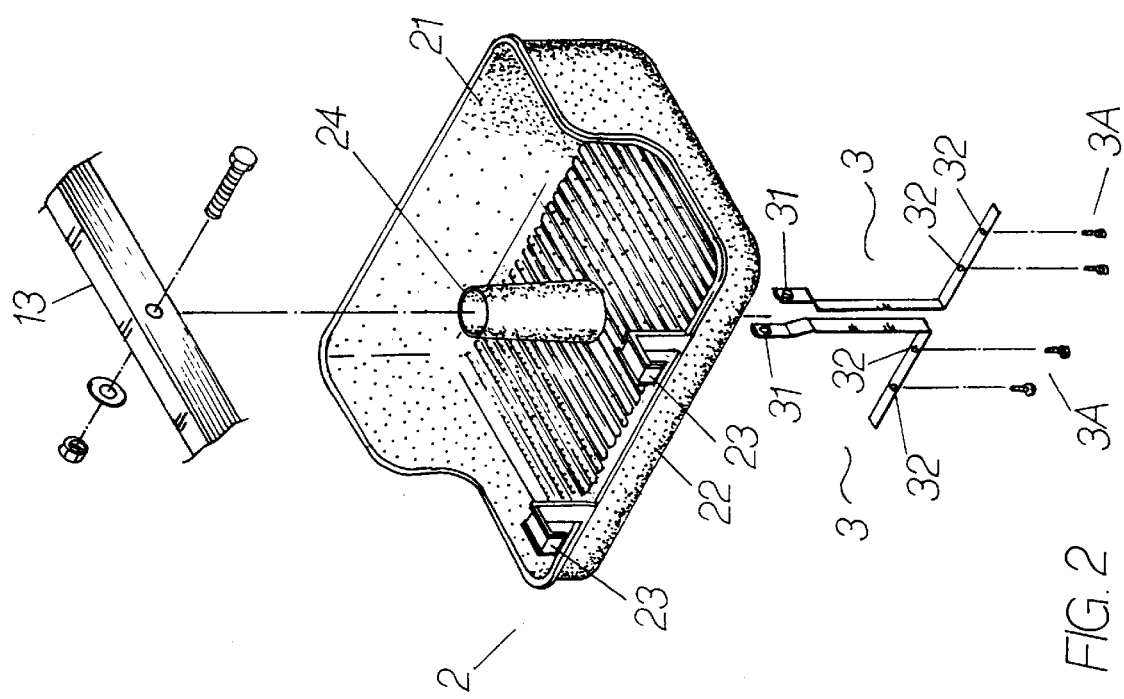
FIG. 2 shows a schematic view of the step of the preferred embodiment of the present invention.
Figure 3:
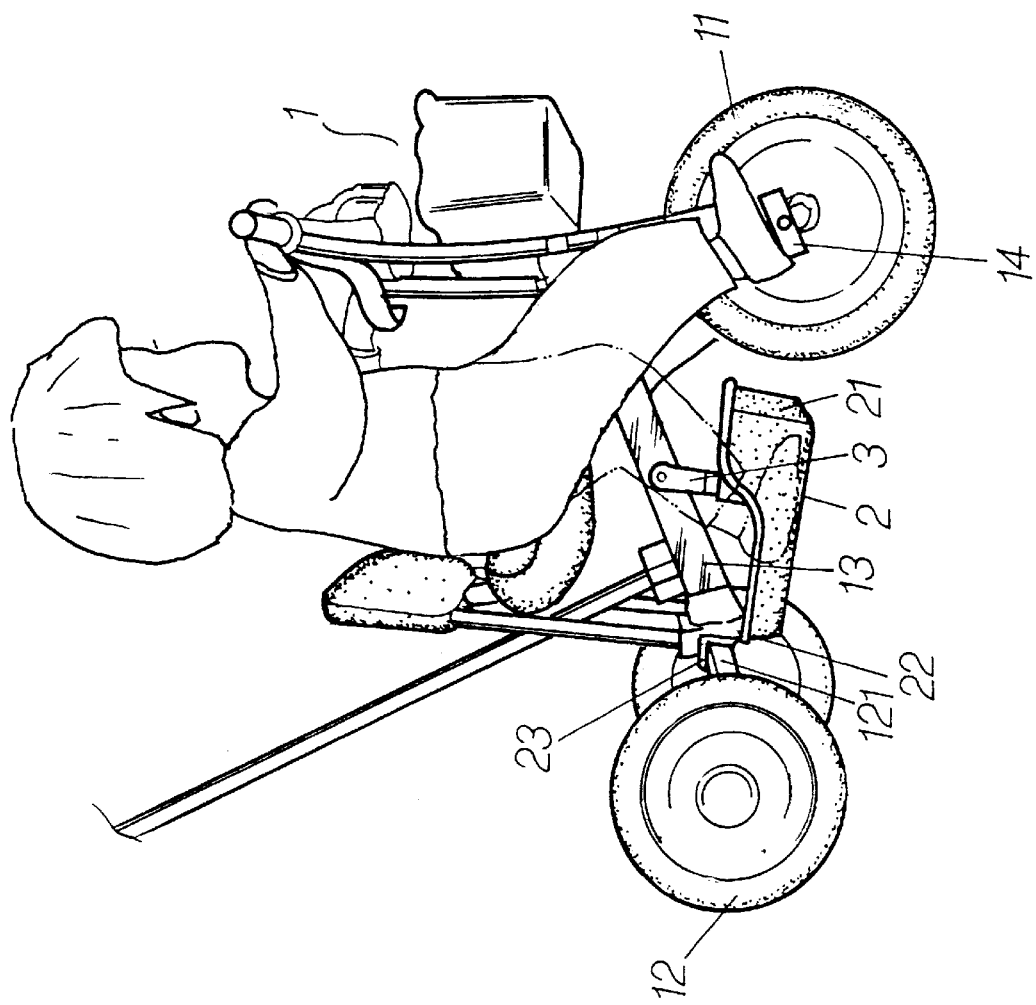
FIG. 3 shows a schematic view of the step of the preferred embodiment of the present invention at work.

As shown in FIGS. 1–3, a tricycle 1 has a front wheel 11, two rear wheels 12, and a middle frame 13 located between the front wheel II and the rear wheels 12. The front wheel 11 is driven by two pedals 14.

A step 2 is located under the tricycle saddle such that the step 2 is held securely by two L-shaped fasteners 3 which are fastened at one end thereof with the frame 13. The step 2 is provided with a front peripheral wall 21 and a rear peripheral wall 22 which is smaller in height than the front peripheral wall 21 contiguous to the front wheel 11. The rear peripheral wall 22 is provided with two hooks 23. The step 2 is provided at the center of the upper side thereof with a hollow cylinder 24 which is made integrally with the step 2 such that the cylinder 24 extends in the direction toward the frame 13.

As shown in FIG. 2, the two L-shaped fasteners 3 are similar in construction to each other and are provided at the free end of one arm thereof with a fastening hole 31, and in other an thereof with a plurality of screw holes 32 for receiving a plurality of fastening screws 3A which are fastened onto the underside of the step 2.

The step 2 of the preferred embodiment of the present invention is fastened under the tricycle saddle such that the two hooks 23 of the step 2 catch the rear wheel frame 121 of the tricycle, and that the two fastening holes 31 of the two L-shaped fasteners 3 are fastened with the frame 13 by a fastening bolt via the hollow interior of the cylinder 24 of the step 2.

When the tricycle is pushed by an adult, both feet of a child riding the tricycle may be kept in the step 2 so as to prevent both feet of the child from being hit or injured by the front wheel 11 in motion or the two pedals 14 in motion. The front peripheral wall 21 is greater in height than the rear peripheral wall 22 for providing the feet of the child with adequate protection.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A step of a tricycle for children, said step being fastened under a saddle of the tricycle to accommodate one or both feet of a child seated on the saddle of the tricycle, so as to prevent the foot or feet of the child from being hit or injured by a front wheel in motion or a pair of pedals in operation of the tricycle at such time when the tricycle is pushed by a person; wherein said step is provided with a front peripheral wall contiguous to the front wheel of the tricycle, and a rear peripheral wall smaller in height than said front peripheral wall, said step further provided at a center of an upper side thereof with a hollow cylinder extending in a direction away from the upper side of said step, said step further provided on said rear peripheral wall thereof with a plurality of hooks fastened therewith; wherein said step is fastened under the saddle of the tricycle such that said hooks of said rear peripheral wall of said step, catch a rear wheel frame of the tricycle, and that said step is held by two L-shaped fasteners each having one arm which is fastened at one end thereof with a middle frame of the tricycle via said hollow cylinder of said step, and another arm which is in contact with an underside of said step and is provided with a plurality of screw holes, through said screw holes a plurality of fastening screws are fastened onto the underside of said step.

* * * * *